UNITED STATES PATENT OFFICE.

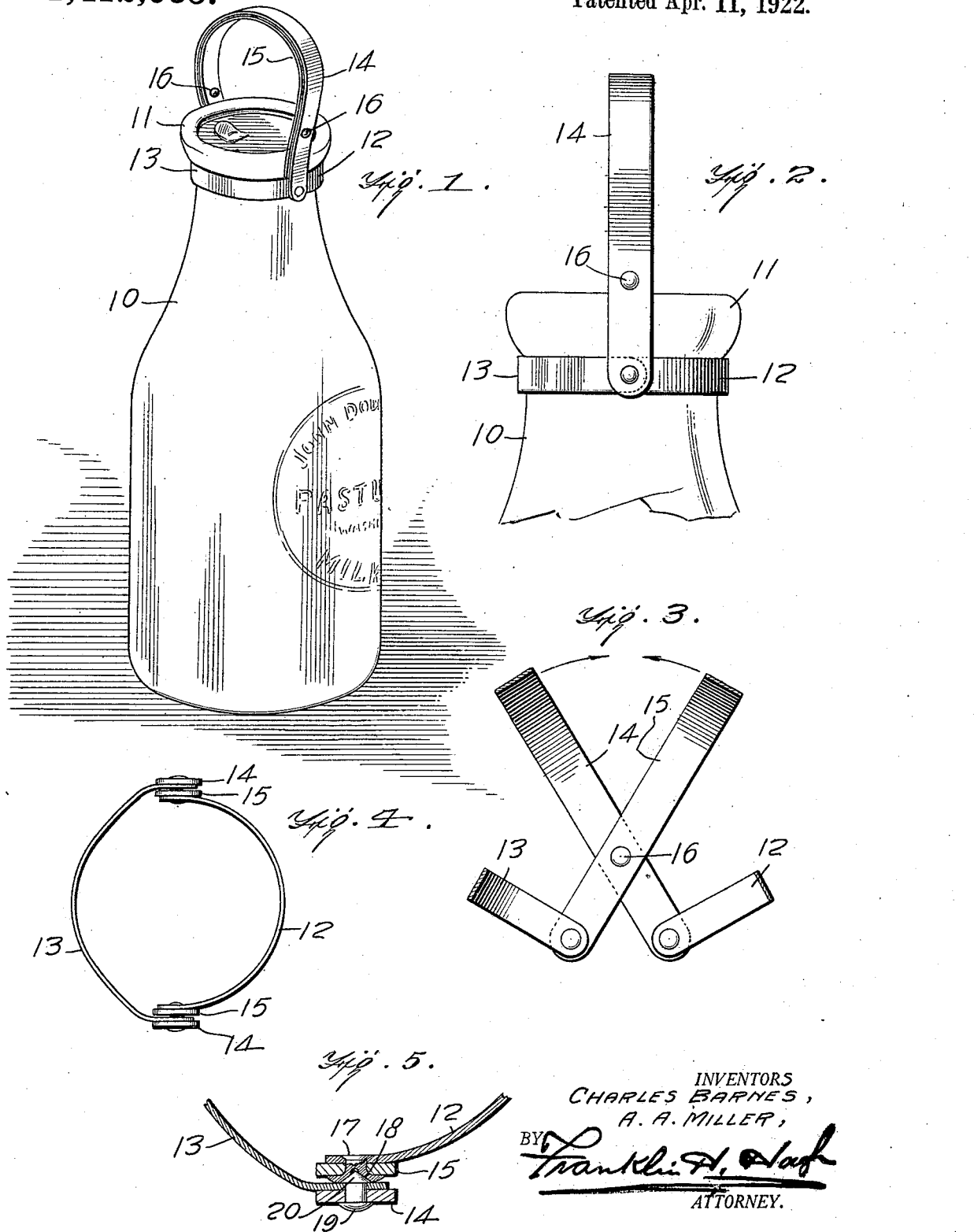

CHARLES BARNES AND ALBERT ALSON MILLER, OF BOONE, IOWA.

CARRYING DEVICE.

1,412,035.  Specification of Letters Patent.  Patented Apr. 11, 1922.

Application filed March 18, 1921. Serial No. 453,223.

*To all whom it may concern:*

Be it known that we, CHARLES BARNES and ALBERT ALSON MILLER, citizens of the United States, residing at Boone, in the county of Boone and State of Iowa, have invented certain new and useful Improvements in Carrying Devices, of which the following is a specification, reference being had therein to the accompanying drawings.

This invention relates to carriers and has for an object to provide a device especially adapted for clamping the tops of conventional milk bottles and furnishing a handle for carrying a milk bottle when so clamped.

A further object of the invention is to provide a handle composed of two members, crossed and pivoted together, having offsets properly curved to embrace the neck of a bottle immediately below the bead, and moved into closed, or engaging position by the movement of the handles upon their pivots.

With these and other objects in view the device comprises certain novel elements, parts, combinations and mechanical movements, as will be hereinafter more fully described and claimed.

In the drawings:

Figure 1 is a perspective view of the invention applied to a conventional milk bottle in closed or carrying relation;

Figure 2 is a view of the device in side elevation clamped upon the neck of a milk bottle;

Figure 3 is a view in section of the device open;

Figure 4 is an inverted plan view of the device, and

Figure 5 is a sectional view through the clamping ring showing a locking modification.

Like characters of reference indicate corresponding parts throughout the several views.

It is well known that milk is marketed in bottles, which, while varying in size and shape, have a substantially uniform neck and bead about the top of the neck. Such a bottle is shown with a neck 10 and bead 11. For the purpose of carrying and transporting the bottle, a device is constructed which clamps upon this substantially uniform neck under the substantially uniform bead, and, therefore, is universal in its application. It comprises a pair of substantially semicircular bands 12 and 13 secured to the lower spaced ends of the bowed handle members 14 and 15. The handle members 14 and 15 are crossed and pivoted at 16, whereby they open to spread the semicircular bands 12 and 13, as indicated more particularly at Figure 3, to permit the device to be passed over the bead 11 and when closed together to clamp about the neck 10 of the bottle, as shown at Figures 1 and 2. The bowed handle 15 is located within the bowed handle 14, as shown more particularly at Figure 1, so that they form together a single bowed handle into which the hand of the carrier may be inserted, holding them thereby together, and the bands 12 and 13 in clamping relation. So that the device may not become loose in the joints and drop off, or be accidentally displaced, a lock is shown at Figure 5 which will temporarily at least hold the band segments 12 and 13 in locking engagement. It comprises a rivet 17 which secures the segments 12 to the bowed handle 15 and is provided with a socket 18. The rivet 19 which secures the segment 13 to the bowed handle 14 is provided with a conical head 20 fitting in the socket 18, and by reason of the resiliency an yielding properties of the parts, when the device is clamped together, the rivets 17 and 19 will snap together with the cone 20 seated in the depression 18 and serve to maintain the parts in such relation until separated.

What we claim to be new is:

1. A carrying device comprising a bowed handle member, a second bowed handle member interlying the first-mentioned bowed handle member and pivoted thereto, and segmental bands carried by the handle members proportioned to form a complete band when the one handle member interlies the other.

2. A carrying device comprising a bowed handle member, a second bowed handle member proportioned to interlie the first-mentioned handle member and pivoted thereto at corresponding points spaced from the extremities of said handle members, segmental bands having their extremities secured to the extremities of the handle members and proportioned to form substantially a complete circle when the one handle member interlies the other.

3. A carrying device comprising a bowed handle member, a second bowed handle member proportioned to interlie the first-mentioned handle member and pivoted thereto, segmental bands carried at the extremities of the handle members and proportioned to form substantially a complete circle when one handle member interlies the other, and snaps carried at the extremities of the handle members adapted to inter-act when the segmental bands are arranged to co-act.

In testimony whereof we hereunto affix our signatures in presence of two witnesses.

CHARLES BARNES.
ALBERT ALSON MILLER.

Witnesses:
R. A. WILDER,
C. M. PIPER.